(12) United States Patent
Mezzoli et al.

(10) Patent No.: US 12,465,334 B2
(45) Date of Patent: Nov. 11, 2025

(54) COLLECTOR FOR LIQUIDS

(71) Applicants: Giorgio Mezzoli, Lugo (IT); Maria Rani, Lugo (IT)

(72) Inventors: Giorgio Mezzoli, Lugo (IT); Maria Rani, Lugo (IT)

(*) Notice: Subject to any disclaimer, the term of this patent is extended or adjusted under 35 U.S.C. 154(b) by 472 days.

(21) Appl. No.: 18/019,963

(22) PCT Filed: Mar. 30, 2021

(86) PCT No.: PCT/IB2021/052608
§ 371 (c)(1),
(2) Date: Feb. 6, 2023

(87) PCT Pub. No.: WO2022/029509
PCT Pub. Date: Feb. 10, 2022

(65) Prior Publication Data
US 2023/0293157 A1  Sep. 21, 2023

Related U.S. Application Data

(63) Continuation-in-part of application No. PCT/IB2020/060698, filed on Nov. 13, 2020.

(30) Foreign Application Priority Data

Aug. 7, 2020 (IT) .................. 102020000019663

(51) Int. Cl.
*A61B 10/00* (2006.01)
*A61M 3/02* (2006.01)
(52) U.S. Cl.
CPC ....... *A61B 10/0051* (2013.01); *A61M 3/0287* (2013.01); *A61M 2202/206* (2013.01); *A61M 2210/0618* (2013.01)

(58) Field of Classification Search
CPC ........ A61M 2202/206; A61M 2202/20; A61M 3/0287; A61M 3/0262; A61M 2210/0618;
(Continued)

(56) References Cited

U.S. PATENT DOCUMENTS 4,709,705 A   12/1987  Truglio
4,768,238 A * 9/1988  Kleinberg .......... A61B 10/0051
                                                      4/144.1

(Continued)

FOREIGN PATENT DOCUMENTS

CN    2474138    1/2002
WO    0238032    5/2002

OTHER PUBLICATIONS

International Search Report and Written Opinion in corresponding International Patent Application No. PCT/IB2021/052608, mailed Jul. 19, 2021 (12 pages).

(Continued)

*Primary Examiner* — Eric F Winakur
*Assistant Examiner* — Hy Khanh Doan
(74) *Attorney, Agent, or Firm* — Leason Ellis LLP

(57) ABSTRACT

A collector (1) for collecting a liquid resulting from a nasal wash, the collector (1) comprising a funnel-shaped body (10) which terminates in a duct (12) that extends between an inlet (14) and an outlet portion (16) provided with coupling members (160) pre-arranged for coupling in a fluid-tight manner with a test tube (162) through a respective mouth (164); the duct (12) having filtering members (20) for the liquid.

14 Claims, 6 Drawing Sheets

(58) Field of Classification Search
CPC ... A61M 1/69; A61M 11/007; A61B 10/0051; A61B 10/0045; A61B 10/02; A61B 10/0096; A61H 2201/1604; A61H 2205/023; A61H 35/04
See application file for complete search history.

(56) References Cited

U.S. PATENT DOCUMENTS

| | | |
|---|---|---|
| 2005/0124974 A1 | 6/2005 | Holman |
| 2009/0108097 A1 | 4/2009 | Lee et al. |
| 2009/0281485 A1 | 11/2009 | Baker et al. |
| 2011/0190814 A1 | 8/2011 | Mark |
| 2017/0028144 A1 | 2/2017 | Flickinger |

OTHER PUBLICATIONS

International Preliminary Report on Patentability in PCT Application No. PCT/IB2021/052608, mailed Nov. 14, 2022 (6 pages).

* cited by examiner

COLLECTOR FOR LIQUIDS

CROSS-REFERENCE TO RELATED PATENT APPLICATIONS

This Patent Application is a U.S. National Phase Application under 35 U.S.C. § 371 of International Patent Application No. PCT/IB2021/052608, filed on Mar. 30, 2021, which claims priority from Italian Patent Application No. 102020000019663, filed on Aug. 7, 2020, and is a continuation-in-part of WO Application No. PCT/IB2020/060698, filed Nov. 13, 2020, all of which are incorporated by reference, as if expressly set forth in their respective entireties.

DESCRIPTION

The present invention concerns a collector. In particular, the present invention refers to a collector for collecting a liquid resulting from a nasal wash. In further detail, the present invention refers to a collector for collecting a liquid resulting from a nasal wash pre-arranged to facilitate the performance of diagnostic tests.

DESCRIPTION OF THE STATE OF THE ART

The diagnosis of infections of the upper respiratory tract can be performed by testing the nasal secretion collected either from the nasopharyngeal or the olfactory area using a small normally flexible stick provided with a sterile cotton swab at a respective end, commonly called "nasopharyngeal swab". The stick must be flexible and, operatively, the swab is inserted in a nostril and pushed horizontally to reach the nasopharyngeal area or pushed upwards to reach the olfactory area until it encounters resistance. In particular, the protocols establish that to take significant samples from the nasopharyngeal or olfactory area, the swab must be inserted in a nostril, pushed right into the corresponding nasal cavity and wiped over the nasopharyngeal lymphatic tissue for 15 seconds using the stick. Obviously a minimum distraction in use of the swab, for example excessive pressure, risks causing damage to the portion of tissue from which the sample of biological material, namely the nasal secretion, is taken. It is known that the nasal mucosa is a very delicate anatomical structure, the surface of which is covered by the mucociliary system; the function of the latter is to protect the organism from external agents that could be inhaled, for example but not limited to pathogens and/or polluting substances. Since it takes one month or more for the mucosa to repair the damage, an interruption of the mucociliary system would open a passage to external agents during the days following use of the swab.

From the above description it is evidently highly recommended for the swab to be carried out by an expert operator, with a good knowledge of nasal anatomy and the ability to identify the anatomical conformation of the nasal cavity of the patient to be examined, in particular in the presence of a deviation or a low crest of the nasal septum which could cause pain and/or loss of blood due to the trauma caused by the swab.

Furthermore, it is obvious that in emergency situations, for example but not limited to a full-blown pandemic, in which the number of individuals to be examined is particularly high and well exceeds the number of expert operators for carrying out the swab in the nasopharyngeal or olfactory area, there is the risk, on the one hand, of the number of samples being too low to provide a rapid reliable picture of the infection levels, and on the other hand, of the information resulting from analysis of the swabs not faithfully representing the infection situation. In both cases the resulting situation is highly unsatisfactory, since public health is at stake. Furthermore, it is important to consider the aspect of operator safety, since the operator, to introduce the swab into the nasal cavity, must necessarily be positioned very close to the patient and therefore, if the swab is carried out on asymptomatic positive individuals or individuals already presenting symptoms of infection, the operator risks being infected, as has already occurred in many cases. In these cases, the operator must necessarily wear personal protective clothing and equipment able to fully cover his/her body; on the other hand, considering that said clothing/devices are of the disposable type, in addition to being subject to the supply chain risk, they represent a very important cost item in terms of purchase and relative disposal.

Examples of conventional collectors are known from WO 02/38032, US 2005/124974, US 2009/281485 and US 2009/108097.

In view of the situation described above, a device that is practical to use and has a limited cost would be desirable, allowing biological samples to be taken, autonomously and effectively, not only from the nasopharyngeal and olfactory area, but also from the mucosa of all the anatomical structures present inside both the nasal cavities and from all the lymphatic tissue present in the nasopharynx, with the result of eliminating the risk of infection of the health care workers who would no longer be involved in the phase of withdrawing quantities of nasal secretion.

It is evident that although the nasal secretion collection devices limit and overcome the typical drawbacks of the known art illustrated above, allowing new operating protocols to be defined for the sampling and analysis of nasopharyngeal/olfactory nasal secretions of numerous groups of people in complete safety and with a high degree of reliability, these devices and the methods of use thereof need to be further improved to ensure increasing reliability of the laboratory and rapid tests carried out on liquid samples of even only a few drops isolated by means of said devices.

SUMMARY OF THE PRESENT INVENTION

The present invention concerns a collector. In particular, the present invention refers to a collector for collecting a liquid resulting from a nasal wash. In further detail, the present invention refers to a collector for collecting a liquid resulting from a nasal wash pre-arranged to facilitate the performance of diagnostic tests.

The above drawbacks are solved by the present invention according to at least one of the following claims.

According to some embodiments of the present invention, a method is provided for identifying pathogens contained in a liquid resulting from a nasal wash, the method comprising a step of feeding said liquid to a duct and, from there, conveying it to a first test tube connected to said duct in a fluid-tight manner; said method, being said step of conveying said liquid to a first test tube, comprises a step of concentrating said pathogens contained in said liquid in filtering means contained inside said duct. According to an embodiment of said method as described above, the method comprises a step of using said liquid retained by said filtering means to carry out tests for the identification of said pathogens.

According to an embodiment of said method as described above, said step of using said liquid is preceded by a step of pressing said filtering means to collect a liquid with high concentration of pathogens in a second test tube. According to an embodiment of said method as described above, said duct extends between an inlet and an outlet portion of a collector for said liquid; said outlet portion being arranged to couple in a fluid-tight manner with said first test tube and/or said second test tube through respective mouths; said filtering means comprising a swab; said step of concentrating said pathogens being preceded by a step of installing, in a stable manner, said swab inside said duct through said inlet.

According to an embodiment of said method as described above, said step of concentrating said pathogens comprises a step of allowing said liquid to flow along said duct through said swab.

According to an embodiment of said method as described above, said step of conveying said liquid to said first test tube is followed by a step of removing said swab from said duct and by a step of squeezing it into said second test tube.

According to an embodiment of said method as described above, said duct comprises a mesh downstream of said inlet to axially delimit a longitudinal cavity of given extension; said step of conveying said liquid into said first test tube being followed by a step of removing said first test tube from said outlet portion, by a step of coupling said second test tube to said outlet portion and by a step of pressing said swab against said mesh to extract a liquid with high concentration of pathogens in said second test tube.

According to an embodiment of said method as described above, said mesh is arranged at a distance from said inlet which approximates by default a longitudinal dimension of said swab; a funnel-shaped body being arranged upstream of said duct and connected in a fluid-tight manner to said inlet; said step of feeding said liquid to said duct is preceded by a step of collecting said liquid in said funnel-shaped body following said nasal wash.

According to an embodiment of said method as described above, said step of pressing said swab against said mesh comprises the step of pushing said swab against said mesh using a presser.

According to an embodiment of said method as described above, said swab is contained inside a basket provided at the bottom with a mesh base and made entirely of deformable material; said basket having gripping means designed to facilitate the handling thereof when, in use, it contains said swab.

According to an embodiment of said method as described above, said step of installing, in a stable manner, said swab inside said duct through said inlet is preceded by a step of inserting said swab inside a basket made entirely of rigid material and provided at the bottom with a mesh base; said basket having a flared annular edge; said gripping means comprising a manipulation rod coupled to said edge.

According to an embodiment of said method as described above, the method comprises a subsequent step of removing said basket containing said swab containing said liquid from said duct, a step of housing said basket containing said swab with said annular edge in contact with a mouth of said second test tube and a step of compressing said swab against said mesh base using a presser.

According to an embodiment of said method as described above, said step of installing said swab in a stable manner inside said duct through said inlet is preceded by a step of inserting said swab inside a basket made entirely of deformable material; said method comprising a subsequent step of inserting the assembly of said basket and said swab containing said liquid inside a third test tube with flexible walls so as to squeeze said swab between said flexible walls and collect the liquid which impregnates said swab in said third test tube.

According to an embodiment of said method as described above, said swab is produced exclusively in one, or in a combination of at least two, of the following materials: cotton, natural silk, artificial silk, non-woven fabric. According to an embodiment of said method as described above, said swab has a cross section geometrically similar to a cross section of said longitudinal cavity and dimensionally approximates by excess said cross section of said longitudinal cavity.

According to an embodiment of said method as described above, said swab has any one of the following shapes: spherical, cylindrical with parallel bases; cylindrical with a concave base having hemispherical or frustoconical shape; cylindrical with a convex base and having hemispherical or frustoconical shape.

According to an embodiment of said method as described above, said swab is of nasopharyngeal type.

According to some embodiments of the present invention, a collector is provided for collecting a liquid resulting from a nasal wash, said collector comprising a funnel-shaped body which terminates in a duct that extends between an inlet and an outlet portion provided with coupling means arranged to couple in a fluid-tight manner with a test tube through a respective mouth; said duct has filtering means for filtering said liquid.

According to an embodiment of said collector as described above, said filtering means comprise a mesh arranged inside said duct downstream of said inlet to axially delimit a longitudinal cavity of given extension.

According to an embodiment of said collector as described above, said filtering means comprise a nasopharyngeal swab provided with a manipulation rod or a filtering swab having longitudinal extension exceeding the axial extension of said longitudinal cavity and cross section that approximates by excess a transverse dimension of said longitudinal cavity.

According to an embodiment of said collector as described above, said filtering swab is pre-arranged to be contained inside a basket provided at the bottom with a mesh base and made entirely of deformable material; said basket having gripping means designed to facilitate the handling thereof when, in use, it contains said swab.

According to an embodiment of said collector as described above, said filtering swab is pre-arranged to be contained inside a basket made entirely of a rigid material and provided at the bottom with a mesh base; said filtering swab having a flared annular edge; said gripping means comprising a gripping rod coupled to said edge.

According to an embodiment of said collector as described above, said filtering swab and/or said nasopharyngeal swab is made exclusively in one, or in a combination of at least two, of the following materials: cotton, natural silk, artificial silk, non-woven fabric.

According to an embodiment of said collector as described above, said duct has a cylindrical shape and said filtering swab has any one of the following shapes: spherical, cylindrical with parallel bases; cylindrical with a concave base having hemispherical or frustoconical shape; cylindrical with a convex base having hemispherical or frustoconical shape.

According to an embodiment of said collector as described above, said longitudinal cavity is cylindrical and has a cross section with diameter measuring a length ranging from 1 to 25 mm.

According to an embodiment of said collector as described above, said collector comprises a first front wall and a second rear wall that extend in a fluid-tight manner from said funnel-shaped body to a different extent between two sides of said body and are facing each other; said second wall being delimited at the top by a concave curved stretch designed to shape-couple, in use, with a facial anatomical portion arranged between the upper lip and the nose of the user.

According to an embodiment of said collector as described above, one of said first wall and second wall has a housing for a rod.

According to an embodiment of said collector as described above, said funnel-shaped body is divided into two parts by a partition arranged between said first wall and second wall.

According to an embodiment of said collector as described above, at least one said side carries an interface elongated transversally to said partition and shaped to house a syringe provided with a nasal nozzle designed to feed washing liquid to a nostril of the user's nose or another feeding device (30).

According to an embodiment of said collector as described above, said funnel-shaped body has a collection tank (100) on the same side as said interface.

BRIEF DESCRIPTION OF THE FIGURES

Further characteristics and advantages of the collectors produced by applying the teachings of the present invention will appear clearer from the following description, provided with reference to the attached figures which illustrate at least one non-limiting embodiment example thereof, in which identical or corresponding parts of the collector are identified by the same reference numbers. In particular.

DETAILED DISCLOSURE OF THE PRESENT INVENTION

Figure 1:
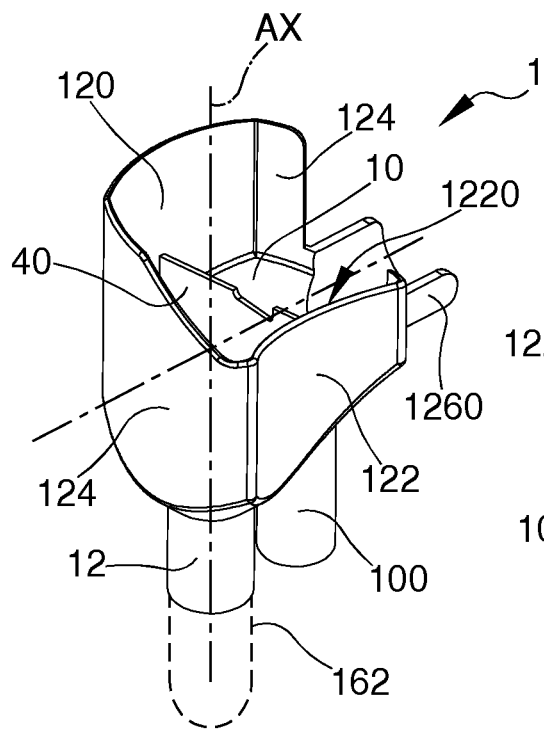
FIG. 1 is a first three-dimensional schematic view of a first preferred non-limiting embodiment of the present invention.

Before describing in detail the preferred embodiments of the present invention or details thereof, it should be noted that the relative protective scope is not limited to the particular embodiments described below. The disclosure and description in the present document illustrate and explain one or more embodiments and variations currently preferred, and it will be clear to persons skilled in the art that various changes in the design, organization, order of operation, means of operation, structures and position of the apparatus, methodology and use of mechanical equivalents can be made without departing from the spirit of the invention.

Furthermore, it must be understood that the attached figures have the purpose of clearly illustrating and disclosing embodiments currently preferred to one of the persons skilled in the art, but they are not drawings that illustrate how said embodiments should be carried out in practice or real representations of end products; on the contrary, said figures can comprise simplified conceptual views to facilitate understanding or allow for an easier quicker explanation. Furthermore, the relative dimensions and arrangement of the components can differ from those shown and still operate in the spirit of the invention.

It will also be evident that various directions such as "upper", "lower", "left", "right", "front", "rear" and so on apply only with respect to the explanation in combination with the drawings and that the components can be oriented differently, for example during transport and production, and during operation. Since many different and distinct embodiments can be provided according to the concepts taught here, and since multiple modifications can be made to the embodiments described here, the details provided below must be interpreted as illustrative and not limiting the spirit of the invention.

In FIGS. 1-8 the number 1 indicates, overall, a collector for collecting a liquid resulting from a nasal wash, where said collector 1 comprises a funnel-shaped body 10 (FIG. 5) terminating in a duct 12 which extends along an axis AX between an inlet 14 and an outlet portion 16, provided with cylindrical coupling members 160 for a test tube 162.

Said coupling members 160 comprise a cylindrical seat 161 (FIGS. 9-12) which extends approximately to the level of the inlet 14. Said seat 161 is shaped in a conjugated manner with the mouth 164 of the test tube 162 to house it in such a way as to entirely collect the liquid resulting from the nasal wash; to facilitate filling of the test tube 162, which can be easily accomplished when the air contained in it can leave space for the liquid, the bottom of the seat is provided with spacers which prevent the edge of the mouth 164 from adhering point by point to the bottom of the seat.

Considering that normally the test tubes 162 are axisymmetric and the respective mouths 164 are cylindrical, the duct 12 and the respective seat 161 have been designed cylindrical, even though it should be noted that this design choice is not essential for producing the invention, which will be fully implemented even when the duct 12 has a cross section of another shape, likewise the test tubes 162 used in combination with the duct 12 and the coupling members 160 of the outlet portion 16. The diameter of the duct 12 at the outlet portion 16 can be expediently in the range 5-25 mm, to couple with test tubes of standard size.

It should be noted that, for the sake of practicality, the test tubes considered as a reference to illustrate the embodiments of the present invention have so far been and below will always be indicated by the reference number 162, all having the same shape at least with reference to the respective mouth 164, without limiting the scope of the present invention.

With particular reference to FIGS. 1-4, the collector 1 comprises a first front wall 120 and a second rear wall 122 which extend in a fluid-tight manner from the funnel-shaped body 10 to a different extent between two sides 124 of the body 10 and face each other; the second wall 122 is delimited at the top by a concave curved stretch 1220 designed to shape-couple, in use, with a facial anatomical portion arranged between the upper lip and the nose of the user.

With particular reference to FIGS. 1, 5, 7 and 8, the funnel-shaped body 10 is divided into two parts by a central partition 40 which lies on a plane M (FIGS. 5 and 7) parallel to the axis AX and is arranged between the first wall 120 and the second wall 122. The funnel-shaped body 10 furthermore has a collecting tank/well 100 with solid bottom on the side opposite the axis AX with respect to the partition 40, arranged to collect an excess of washing liquid that has not passed to the other nasal cavity and, therefore, is expelled from the same nostril into which said liquid has been delivered.

Figure 2:
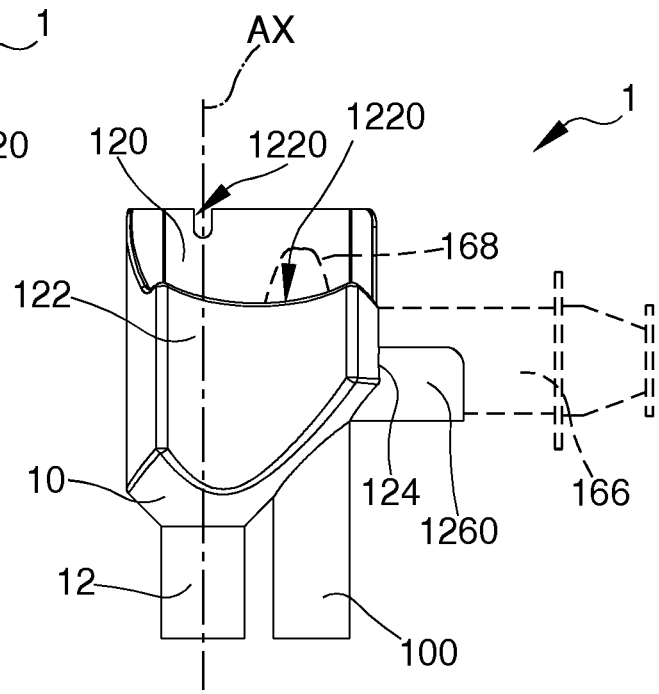
FIG. 2 is a rear view of FIG. 1 in an operating condition.
Figure 3:
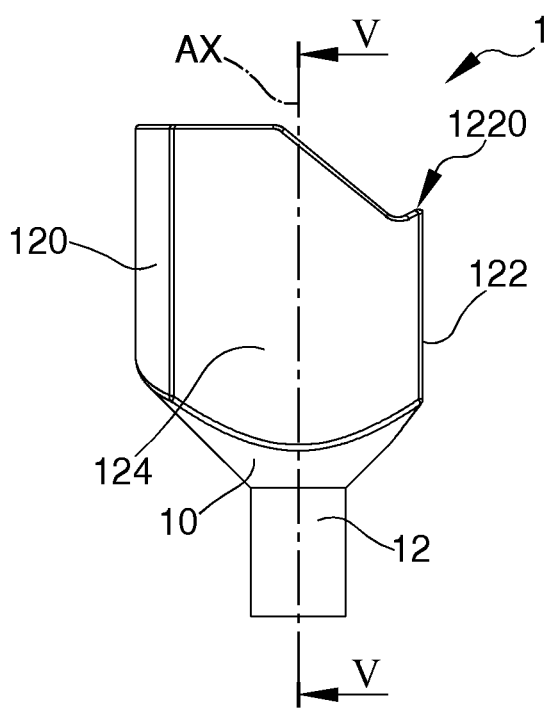
FIG. 3 is a lateral elevation view of FIG. 1.
Figure 4:
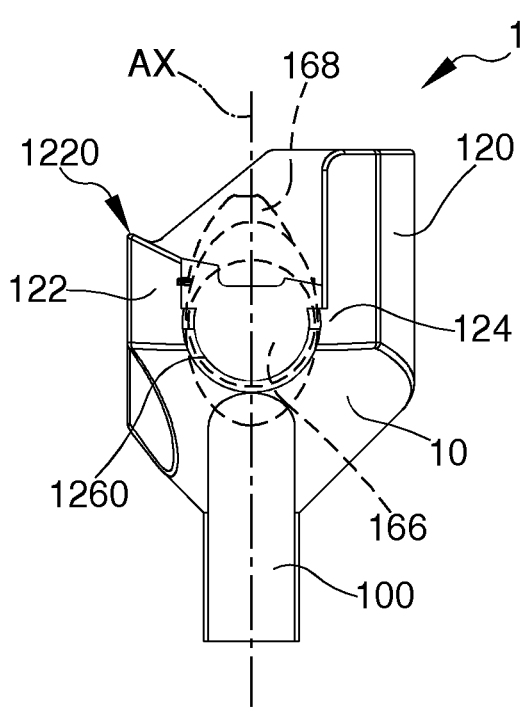
FIG. 4 is a lateral elevation view of FIG. 2.
Figure 5:
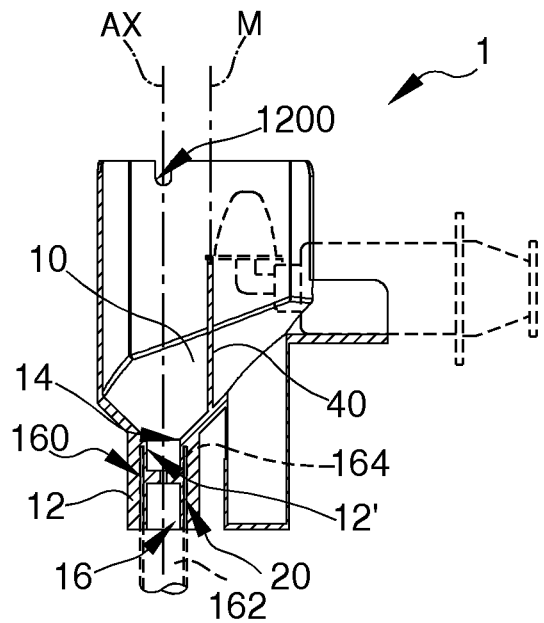
FIG. 5 is a longitudinal section of FIG. 2 according to the line V-V of FIG. 3 in an operating condition.
Figure 6:
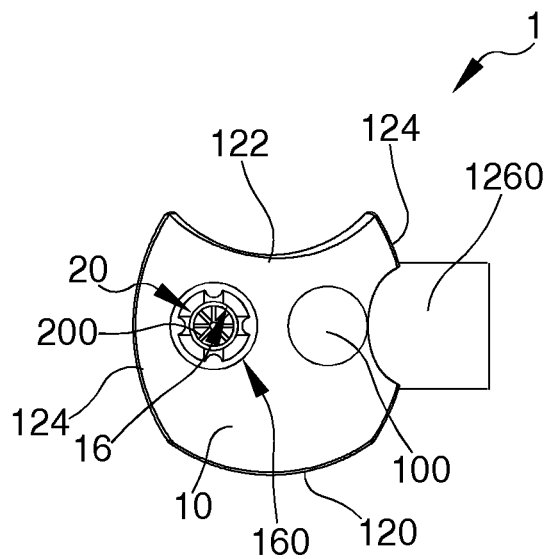
FIG. 6 is a bottom view of FIG. 2.
Figure 7:
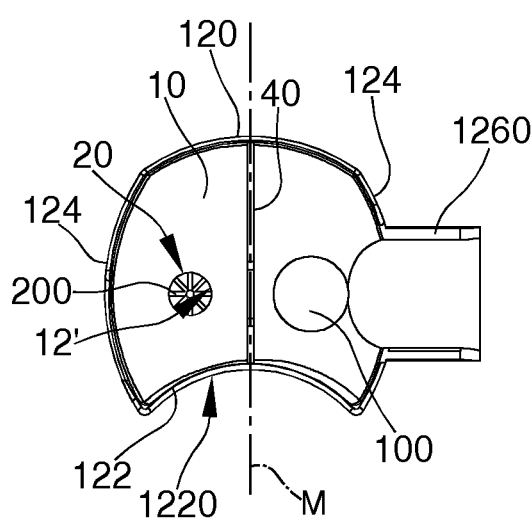
FIG. 7 is a plan view of FIG. 2.
Figure 8:
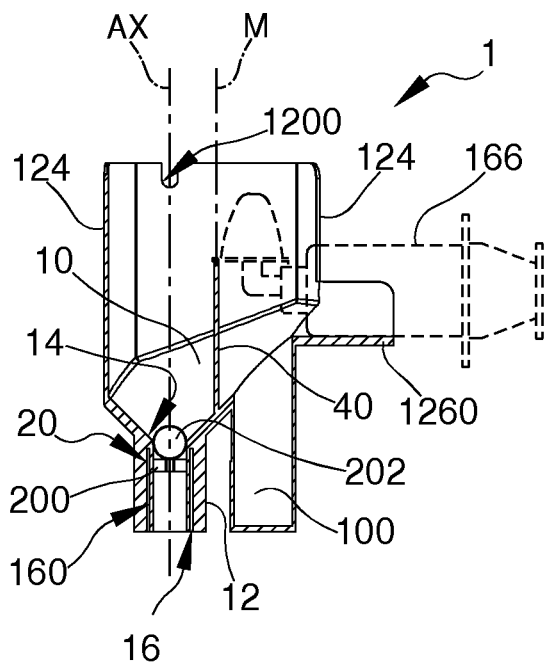
FIG. 8 illustrates FIG. 5 with the addition of a first embodiment of a given component.
Figure 9:
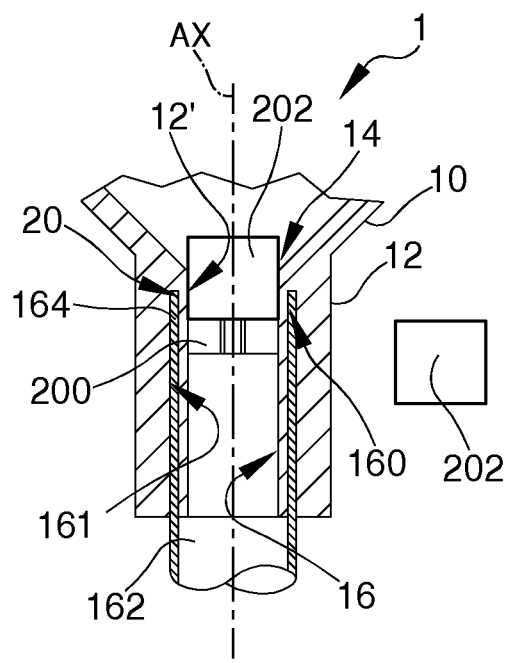
FIGS. 9-12 illustrate on an enlarged scale a central portion of FIG. 8 with the addition of distinct embodiments of a given component.
Figure 10:
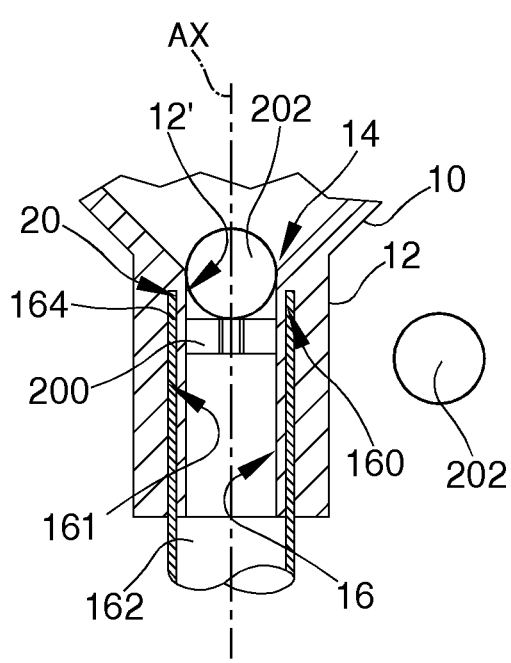
Figure 11:
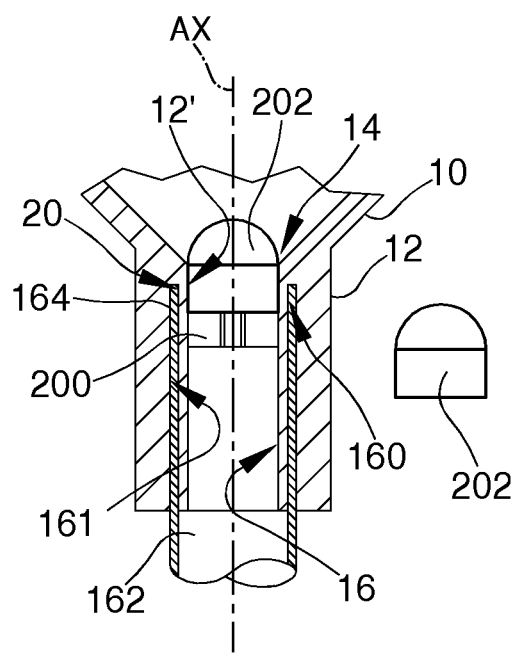
Figure 12:
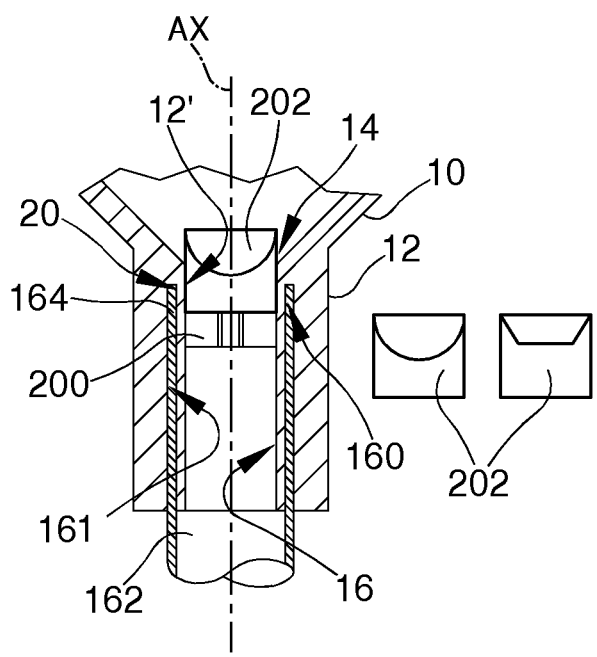
Figure 13:
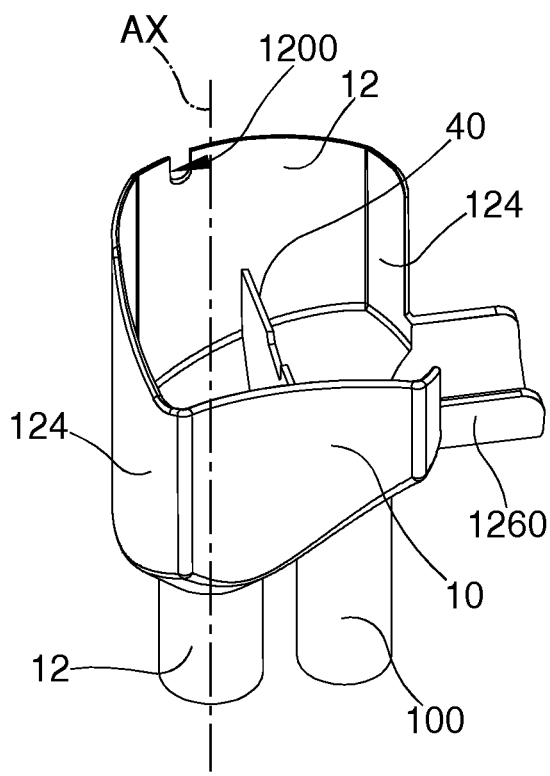
FIG. 13 is a three-dimensional schematic view of a second preferred non-limiting embodiment of FIG. 1.
Figure 14:
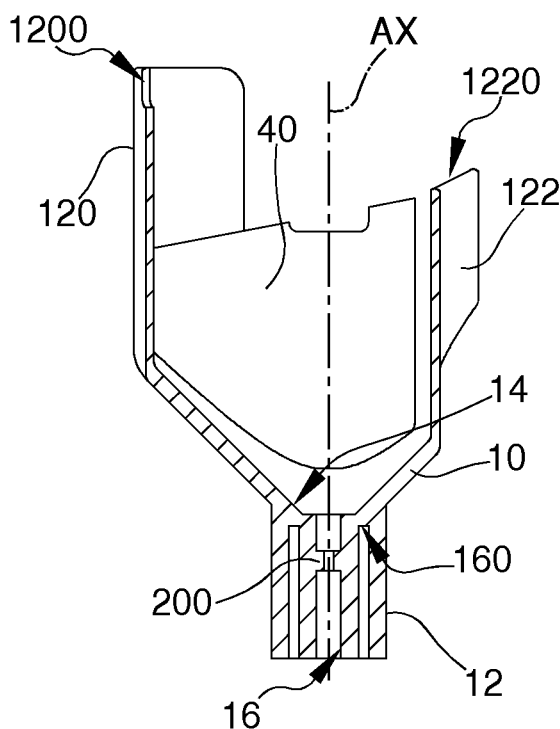
FIG. 14 is a view in longitudinal section of FIG. 13.
Figure 15:
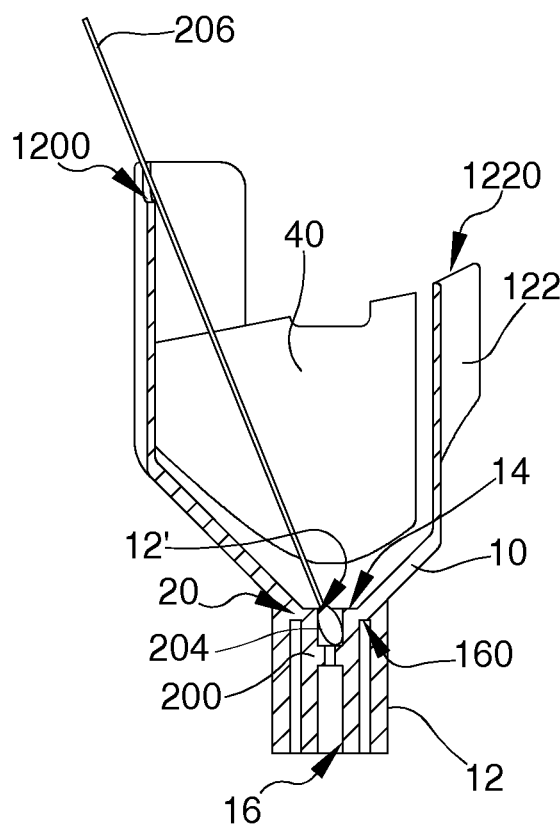
FIG. 15 shows FIG. 14 in an operating condition.

With particular reference to FIGS. 1, 2 and 4, at least a side 124 carries an interface 1260 elongated transversely to the plane M and to the axis AX and shaped to house a syringe 166 to whose outlet nozzle a nasal dispenser 168 is coupled by means of an L-fitting (FIGS. 5 and 8), where the function of the dispenser 168 is to feed washing liquid through the nasal vestibule of a nasal cavity of a user when, in use, the user with head inclined forward below the shoulders brings the collector 1 with the axis AX inclined by the same angle, with the respective concave curved stretch 1220 into contact with the skin of the portion of face between the upper lip and the nose to prepare for washing, via the dispenser 168, of the corresponding nasal cavity, the nasopharynx and opposite nasal cavity on the other side of the nasal septum.

The situation illustrated in the attached figures wherein the duct 12 is arranged on the right of the partition 40, therefore on the side opposite to the interface 1260 for the syringe 166, and to the well 100, is due exclusively to the fact that the majority of people are right-handed and find it easier to operate the syringe 166 with their right hand; this choice is therefore not designed to limit the scope of the present invention which is implemented in exactly the same way in collectors in which the position of the interface 1260 and of the duct 12 are inverted, thus being adapted for use preferably by people who find it easier to use their left hand. It should be noted that the washing liquid supplied by the syringe 166 can consist exclusively or partly of a physiological saline solution or another liquid or solution of any other type, based on the directions of the doctor or the manufacturer, without affecting the protective scope of the present invention.

Figure 19:
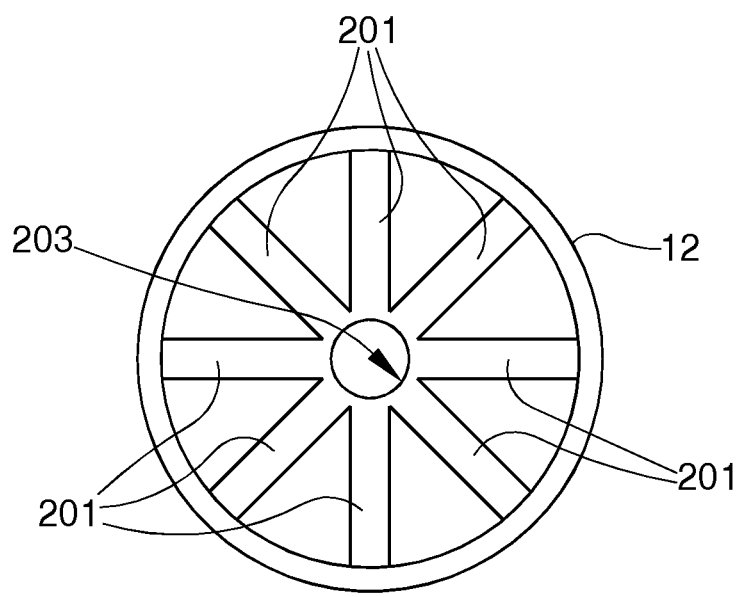
FIG. 19 is a top view of a detail of FIG. 1 shown on an enlarged scale where some parts are not shown for the sake of clarity.

With particular reference to FIGS. 5-12, the duct 12 has filtering members 20 designed to retain any pathogens contained in the liquid after the nasal wash. Here and below, the term "pathogens" refers and will refer, individually or in combination, to: virus, bacteria, fungi and/or any other type of pathogenic microorganism responsible for the onset of disease in the host organism. Said filtering members 20 comprise a mesh 200 which is arranged inside the duct 12 downstream of the inlet 14 which axially delimits a longitudinal cavity 12' of given extension. Only in FIG. 19 an enlargement is shown of a version in which the mesh 200 has a plurality of arms 201 arranged radially starting from a central portion provided with a hole 203, which has the purpose of maximizing the size of the outlet area of said mesh 200.

With particular reference to FIGS. 8-12, the filtering members 20 comprise a removable swab 202 arranged inside the cavity 12' preferably in contact with the mesh 200.

Operatively, it should be noted that, according to user preferences, the swab 202 can have a longitudinal extension approximating by excess or by default the axial extension of the cavity 12' and a cross section approximating by excess a transverse dimension of said longitudinal cavity 12'. Naturally, if the swab 202 has a longitudinal extension which approximates by excess the axial extension of the cavity 12', in use, the respective upper portion will engage the body 10.

The transverse dimension of the swab 202 will therefore be proportional so as to engage the cross section of the longitudinal cavity 12' with peripheral interference, in order not to allow seepage of the nasal wash liquid collected in the funnel-shaped body 10. Therefore, considering the increased size of the section with respect to the section/diameter of the longitudinal cavity 12', the transverse dimensions will be at least in the range 5-25.

Below an application of the swab 202 is described in which said swab has a longitudinal extension exceeding the extension of the cavity 12' without limiting the scope of the present invention.

The swab 202 can be produced in any material able to filter the liquid resulting from a nasal wash to retain as far as possible any pathogens, including viruses, that may be removed from the nasal cavities crossed by the washing liquid. Said materials must also have the characteristic of being compressible but at the same time tending to return to their original undeformed configuration, completely filling the space in which they were pressure-inserted, in this case the cavity 12'. For the sake of practicality, but without limiting the scope of the present invention, each swab 202 can be produced exclusively in one, or in a combination of at least two, of the following materials: cotton, natural silk, artificial silk, nonwoven fabric.

Furthermore, the swab 202 can have any of the following shapes (as can be seen beside each of the FIGS. 9-12): spherical, cylindrical with parallel bases, cylindrical with a concave base having hemispherical or frustoconical shape, cylindrical with a convex base having hemispherical or frustoconical shape, or any other shape, also irregular, and dimension that allows the cavity 12' to be completely engaged when the swab 202 abuts against the mesh 200 and has a respective free end (on the side of the funnel-shaped body 10) at a level slightly higher than the connection between the duct 12 and the funnel-shaped body 10, so as to prevent seepages of liquid.

Due to its shape, in use, the swab 202 can be inserted in the cavity 12' at the back of the mesh 200 with a tweezer and, after completion of the nasal wash, once the liquid resulting from the nasal wash has been filtered, and therefore any pathogens present have been concentrated inside the swab 202, the latter is impregnated with said liquid and can be removed using a tweezer.

Operatively, once the liquid resulting from the nasal wash has been discharged below the swab 202, the latter is impregnated with said liquid saturated with pathogens and there are two possible methods of completing the procedure:
—the swab 202 is removed by means of the tweezer from the cavity 12' and placed in a test tube, the walls of which are deformable, so that by squashing the walls of the test tube, the filtered liquid in which the swab 202 is soaked is squeezed, causing the outflow of any pathogens present,
the swab 202 is gripped with a tweezer provided with concave tips which, when brought together, squeeze the swab; this can be done vertically over the mouth of a test tube or other container.

Figure 16:
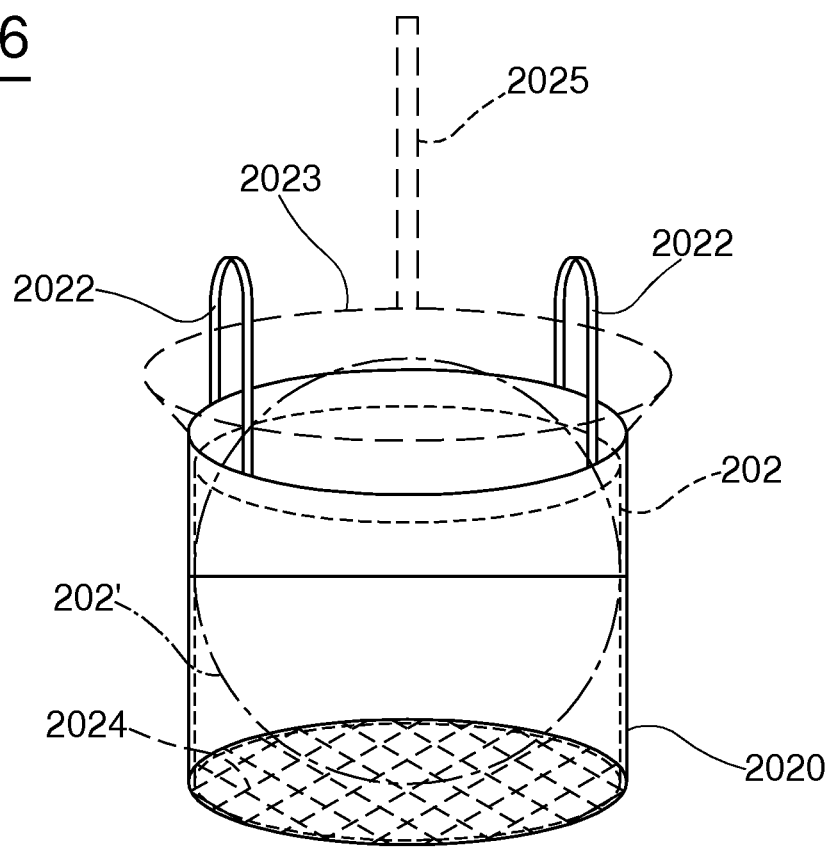
FIG. 16 illustrates on an enlarged scale an accessory that can be used in combination with any one of FIGS. 8-12.

A more practical solution could entail the use of a basket 2020 which is delimited by a peripheral surface substantially identical to that of the cavity 12' like the one illustrated in FIG. 16. Said basket 2020 is provided with a mesh bottom 2024 (FIG. 16) and a gripping member which can be provided by handles 2022 to facilitate handling in general but above all when the basket 2020 contains, in use, the swab 202.

Differently, the basket 2020 could be rigid and provided with a flared annular edge 2023 (illustrated funnel-like by a broken line again in FIG. 16 for the sake of economy of drawing) the maximum outer dimension of which should be greater than the cross section of the cavity 12' to limit the insertion depth of the basket 2020 inside it. To said edge 2023 a rod 2025 could be coupled, which would facilitate handling of the basket 2020, relative insertion into the cavity 12', with or without the swab 202 contained in it, and extraction from said cavity 12' at the end of washing with the swab 202 contained in it. In order to facilitate handling of the basket 2020, the front wall 120 of the collector 1 can have a housing 1200 (shown in FIGS. 2, 5, 8) which, in use, keeps the rod 2025 away from the user's nose.

It should be noted that the swab 202 contained in the basket 2020 can have any shape, as can be seen in FIG. 16, in which two swabs 202 are shown, one cylindrical identified by the reference number 202 and one spherical, shown by a dot-dash line, identified by the reference number 202'.

Figure 17A:
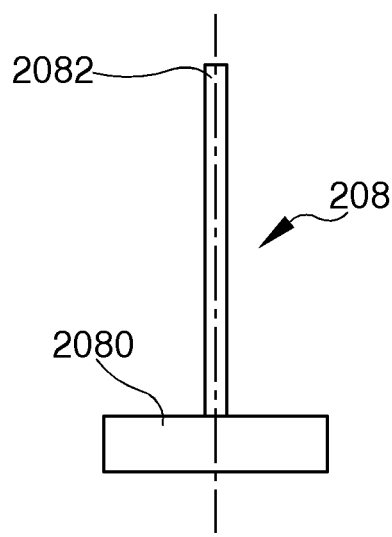
FIGS. 17 a) and 17 b) show in lateral elevation and in plan an accessory that can be used in combination with FIG. 13.
Figure 17B:
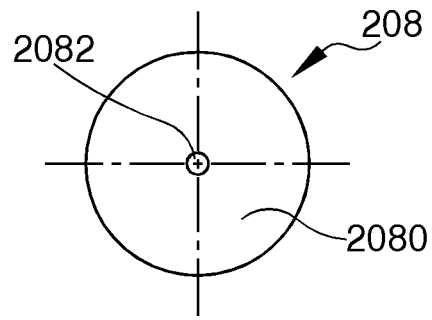
Figure 18:
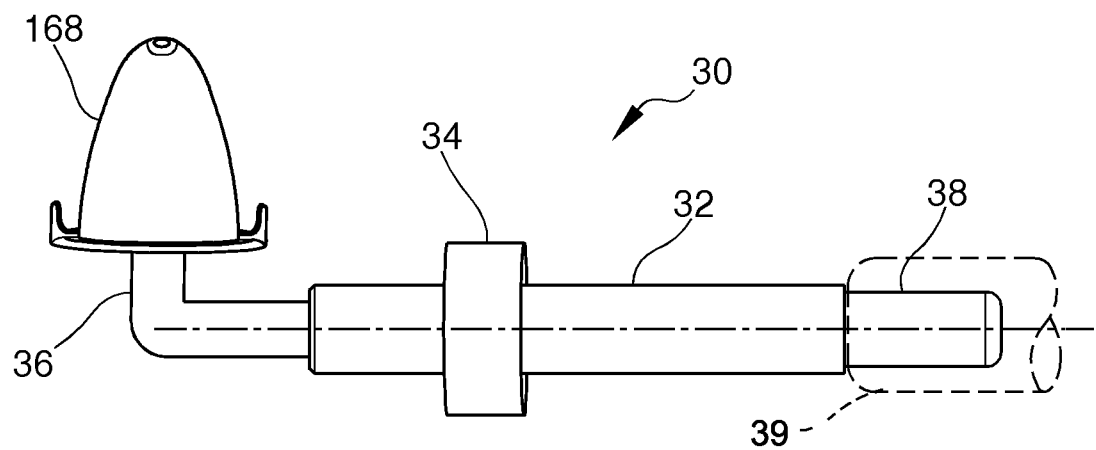
FIG. 18 is a lateral elevation view of an accessory that can be used in association with FIG. 1 or with FIG. 13.

With reference to the basket 2020 the following configurations are possible:
- the basket 2020 comprises a peripheral wall and a mesh bottom 2024, is made entirely of deformable material so that once the basket 202 containing the swab 202 impregnated with liquid saturated with pathogens is inserted inside a test tube with flexible walls, the swab 202 can be squeezed by squashing the test tube walls and filled with the content of the swab 202;
- the basket 2020 comprises a peripheral wall, the edge 2023 and the mesh bottom 2024, and is made entirely of rigid material so that once the basket 2020 has been removed from the cavity 12' with the swab 202 inside it, said assembly can be inserted inside a rigid test tube with the edge 2023 of the basket 2020 in contact with the mouth of the test tube to place the basket 2020 longitudinally in a fixed manner; at this point the swab 202 can be squeezed by pressing it with a presser 208 illustrated in FIGS. 17a and 17b, comprising a plate 2080 and a gripping rod 2082. It should be noted that the plate 2080 has a cross section which approximates by default the cross section of the basket 2020 to prevent the concentrated liquid in the swab 202 from splashing out and contaminating the external environment.

The use of the collector 1 described above is easy to understand and does not require further explanations.

With particular reference to FIGS. 1-12, it should be noted that through the use of the collector 1 it is possible to implement a method for diagnosing the presence of any pathogens inside the nasal and nasopharyngeal cavities by examining the result of the washing liquid delivered inside the nasal and nasopharyngeal cavities. The washing liquid will be dispensed through the syringe 166 housed in the interface 1260 and provided with the nasal dispenser 168 as illustrated in FIGS. 2, 4, 5, 8. In this regard, firstly, the collector 1 can be used to carry out a step of collecting the liquid resulting from the nasal wash, in sequence, in the funnel-shaped body 10, in the cavity 12' of the duct 12 and from here in a first test tube 162, and using the liquid collected in said container to perform a test of any type. In the case of diagnosis of the SARS-CoVid 2 virus, also known as Covid-19, this liquid is suitable for performing antigen and PCR tests. Operatively, the collector 1 must be provided with a first test tube 162, a swab 202 having any one of the shapes described above inserted in the longitudinal cavity 12' until it abuts against the mesh 200 and a syringe 166 coupled with the respective interface 1260 provided with the respective dispenser 168 and filled with washing liquid. Once the user has inclined his/her head forward as described above, the collector 1 has been positioned with the concave curved stretch 1220 of the second wall 122 shape-coupled with the facial portion arranged between the upper lip and nose, the dispenser 168 has been introduced inside the right-hand nasal vestibule, due to the particular shape of the collector 1, so that the outer wall of the dispenser 168 adheres to the inner wall of the nasal vestibule to create a seal, at this point the user can operate the plunger of the syringe 166 thus dispensing the washing liquid contained in it.

As is known, the washing liquid will be diffused inside the right-hand nasal cavity filling it completely and then spreading, through the nasopharyngeal area, which is the site of the lymphatic tissue, into the second nasal cavity, filling it completely. In particular, the volumetric quantity that exceeds the volume of the right-hand nasal cavity, will flow into the left-hand nasal cavity and then, by gravity, into the funnel-shaped body 10, on the left of the partition 40. From here, the liquid resulting from washing of the two nasal cavities crossed will percolate through the swab 202 contained in the cavity 12' and from here under the mesh 200 below. The percolated liquid will therefore be filtered by the swab 202 which will have retained inside it any pathogens present in the liquid resulting from the nasal wash. Subsequently, the percolated liquid, substantially free from pathogens, will continue by gravity its flow into the test tube 162 below. The more compacted the component material of the swab 202, the slower the percolation of the liquid through the swab 202; this characteristic of the swab 202 will determine the respective capacity to filter and therefore to concentrate any pathogens present in the liquid that impregnates said swab 202.

It is easy to understand that, due to the filtering capacities of the swab 202, the higher the filtering capacity of the swab 202, the lower the pathogen content of the test tube 162. Therefore, in the event of a choice between whether to carry out tests on the content of the test tube 162 or on the liquid absorbed by the swab 202, it will make sense to perform the test on the liquid contained in the swab 202. To collect said liquid, a further new test tube 162 of rigid type can be used which will replace the first test tube 162 coupled with the outlet portion 16 of the collector 1 at the beginning of the nasal wash. Consequently, the liquid contained by the first test tube 162 can be eliminated. In particular, the presser 208 can be used to compress the swab 202 inside the longitudinal cavity 12' against the mesh 200 so as to squeeze the liquid retained to feed it to the new test tube 162. Therefore, on the bottom of this new test tube 162 a small quantity of liquid will collect with a high pathogen concentration. The compression of the swab 202 by means of the presser 208 will be all the more effective if the respective plate 2080 is geometrically similar to the cross section of the longitudinal cavity 12', since in said case all the part of the swab 202 exposed towards the funnel-shaped body 10 will undergo compression, avoiding the risk of the swab 202 splashing filtered liquid, therefore ensuring hygiene and prevention of infection.

Naturally, if the basket 202 is rigid as described above, the test tube that will be used to house the basket 2020 and the relative swab 202, in order to collect the liquid retained by the latter, will also be rigid and said liquid can be transferred into the test tube by squeezing the swab 202 by compressing it against the mesh bottom 2024 with the presser 208.

Alternatively, in the presence of a new test tube 162 with pressure-deformable cylindrical wall, once the swab 202 has been removed from the duct 12' with a pair of tweezers, said swab 202 can be inserted in the new test tube 162, a dripper cap applied and the flexible walls of the test tube squashed repeatedly on the swab 202, so as to cause outflow of the concentrated liquid retained by the swab 202; said liquid will collect on the bottom of the new test tube 162 together with the concentrated pathogens. Differently, if the swab 202 is contained inside the basket 2020 and the respective circular wall and respective mesh bottom 2024 are flexible, once the liquid resulting from the nasal wash has been filtered, the basket 2020 containing the swab 202 soaked in pathogen-concentrated liquid can be removed using the handles 2022 of the basket or the respective rod 2025; the assembly of the basket 2020 and swab 202 can be inserted in a further new test tube 162, this time provided with flexible walls so that the swab 202 can be squeezed between the flexible walls of the test tube 162 and the liquid that impregnates it can be collected in the bottom of the second test tube 162 with the pathogens contained in it.

At this point, having collected the filtered liquid in a new test tube 162, to highlight the presence of SARS-CoV-2, or any other pathogens, it will be possible, alternatively or subsequently, to apply a dripper cap to the new test tube 162 and deposit at least one drop of the filtered liquid inside the small groove of a device prearranged to carry out the rapid antigen test, apply a sealing cap and send the new test tube 162 to a laboratory for the PCR test of the remaining filtered liquid.

Lastly, it is clear that modifications and variations can be made to the collector 1 described and illustrated here without departing from the protective scope of the present invention. For example, with reference to FIGS. 13-15 the collector 1 can be modified to be used in combination with swabs 204 (FIG. 15) having a decidedly smaller transverse dimension, like those for the nasopharynx and/or the oropharyngeal cavity, where the diameter ranges from 1.4 to 2 mm. Naturally, to be able to apply the method described above to this type of collector, the duct 12 has to have an appropriate diameter, therefore in the range 1-2 mm to contain the swab 204 with its filtering part slightly compressed inside the longitudinal cavity 12'. This type of swab 204, normally provided with a rod 206 to facilitate handling, can be used to provide, by squeezing, limited quantities of liquid suitable for performing antigen tests, or inserted inside test tubes with flexible walls and squeezed to perform PCR tests. In order to facilitate handling of the swab 204 during the nasal wash, it is useful for the front wall 120 of the collector 1 to have a housing substantially identical to the housing 1200 of FIGS. 2, 5 and 8 and, for this reason, indicated by the same reference number, the function of which is to keep the rod 206 away from the user's nose. In these cases, it may be useful to add a small quantity of physiological solution (approximately 1-2 ml) to the liquid extracted from the swab 204 to facilitate the formation of drops for the performance of rapid tests.

In addition, the collector 1 can be modified in such a way as to present two interfaces 1260 arranged on opposite sides with respect to the partition 40, one for each side 124 and, naturally, the body 10 can be symmetrical with respect to the partition 40, therefore be provided with two ducts 12, each provided with the outlet portion 16 and, therefore, without the well 100 but suitable for carrying two test tubes 162, as described in the application PCT/IB2020/060698.

It should be noted that the method described above based on the use of a swab 204 to filter the liquid resulting from a nasal wash has the following advantages with respect to use of the same swab for direct sampling of nasal secretion from the nasopharyngeal lymphatic tissue carried out by health workers. Said sample can be taken only in a given and limited area of the nasopharyngeal tissue and, given the very small size of the absorbent part of the swab 204, the quantity of nasal secretion removed is also very small.

Differently, the use of a swab 202 with the methods described above or a swab 204 in association with the collector 1 of FIGS. 13-15 offers the following advantages:

- there is obviously a relation between the quantity of solution used for washing the nasal and nasopharyngeal cavities and the quantity of pathogens that can be removed from the nasal cavities; therefore, the greater the quantity of washing liquid dispensed, the greater the concentration of pathogens retained by the swab 202 or by the swab 204 so that, operating as described above, the pathogens will be particularly easy to identify, and much easier to identify than when using the nasopharyngeal swab 204 directly in the nasal cavities;
- the pathogens are "loaded" in the swab 202 or in the swab 204 used in combination with the collector of FIGS. 13-15 by the patient without third party intervention; it is obvious that this results, on the one hand, in a significant financial saving and, on the other, in a reduction in the risk of spreading the infection.

Consequently, the quantity of pathogens concentrated in the swab 202 or 204 is strictly correlated with the quantity of nasal washing liquid which is dispensed to the right-hand nostril, in the version of the collector 1 described with reference to the attached figures, without limiting the scope of the present invention. On the other hand, the use of a syringe 166 with volume larger than or equal to 60 ml could result in the drawback of the assembly of the collector 1 and syringe 166 being difficult to handle for some users. To overcome this drawback the syringe 166 can be replaced with a liquid feeder 30 that can be seen in FIG. 18, which has a cylindrical body 32 that carries at least a cylindrical portion 34 of adequate diameter for engaging in a stable manner the interface 1260 in a conjugated manner. Naturally, the feeder 30 carries the nasal dispenser 168 by means of an L-shaped fitting 36 and on the opposite side has a feed inlet 38 to which an outlet tube 39 can be coupled (a part of which is illustrated by a broken line) of a known and not illustrated bag of the type, by way of non-limiting example, sold under the name "Lavonase" by Purling S. r. l., designed to contain at least 250 ml of nasal washing liquid. Naturally, the volume of the liquid resulting from the nasal wash will be decidedly greater than that discharged from the nostril opposite the one to which the washing liquid is delivered using a syringe, therefore it would be expedient to replace the first test tube 162 with an outlet bag provided with an inlet shaped similarly to the mouth 164 of the test tube 162 to make it couplable, in a fluid-tight manner, with the outlet portion 16, in particular with the cylindrical coupling members 160, or with a container of any other type.

Based on the above description, it is easy to understand that the collector 1 solves in a simple inexpensive manner the drawbacks typical of the state of the art illustrated above, in addition to allowing for the definition of new operating protocols for the sampling of nasopharyngeal/olfactory nasal secretion of numerous groups of people to be analysed in complete safety and with a high level of reliability, maximizing the probability of encountering the presence of pathogens in the liquid resulting from the nasal wash, via both antigen and PCR tests.

At this point, it is useful to specify that in the following claims any reference sign in brackets should not be interpreted as a limitation of the claim. The word "comprising" does not exclude the presence of other elements or steps in addition to those listed in a claim. Furthermore, the term "one", as used in this context, is defined as one or more than one. Furthermore, the use of introductory phrases like "at least one" and "one or more" in the claims should not be interpreted in the sense that the introduction of another claim element by the indefinite articles "a" or "an" limits any particular claim containing said claim element introduced to the inventions that contain only one, even when the same claim comprises introductory phrases like "one or more" or "at least one" and indefinite articles like "one" or "an". The same applies to the use of definite articles. Unless established otherwise, terms like "first" and "second" are used to arbitrarily distinguish the elements which said terms describe. Therefore, these terms are not necessarily designed to indicate the chronological or any other priority of said elements. The simple fact that some measures are described in different claims does not mean that a combination of these measures cannot be used to advantage.

The invention claimed is:

1. A collector (1) for collecting a liquid resulting from a nasal wash, said collector (1) comprising a funnel-shaped body (10) which terminates in a duct (12) that extends between an inlet (14) and an outlet portion (16) provided with coupling means (160) pre-arranged to couple in a fluid-tight manner with a test tube (162) through a respective mouth (164); said collector comprising a first front wall (120) and a second rear wall (122) which extend in a fluid-tight manner from said funnel-shaped body (10) to a different extent between two sides (124) of said funnel-shaped body and face each other; characterized in that said second wall (122) is delimited at the top by a concave curved stretch (1220) designed to shape-couple, in use, with a facial anatomical portion arranged between the upper lip and the nose of the user; said funnel-shaped body (10) being divided into two parts by a partition (40) arranged between said first wall (120) and said second wall (122).

2. The collector according to claim 1, characterized in that said duct (12) has filtering means (20) for filtering said liquid.

3. The collector according to claim 2, characterized in that said filtering means comprise a nasopharyngeal swab (204) provided with a manipulation rod (206) or a filtering swab (202) having longitudinal extension exceeding the axial extension of said longitudinal cavity (12') and cross section which approximates by excess a transverse dimension of said longitudinal cavity (12').

4. The collector according to claim 3, characterized in that said filtering swab (202) is pre-arranged to be contained inside a basket (2020) provided with a mesh bottom (2024) and made entirely of deformable material; said basket (2020) having gripping means (2022) (2025) designed to facilitate the handling thereof when, in use, it contains said swab (202).

5. The collector according to claim 3, characterized in that said filtering swab (202) is pre-arranged to be contained inside a basket (2020) made entirely of rigid material and provided with a bottom mesh (2024); said filtering swab (202) having a flared annular edge (2023); said gripping means (2025) comprising a gripping rod (2025) coupled with said edge (2023).

6. The collector according to claim 3, characterized in that said filtering swab (202) and/or said nasopharyngeal swab (204) is made exclusively of one, or a combination of at least two, of the following materials: cotton, natural silk, artificial silk, non-woven fabric.

7. The collector according to claim 3, characterized in that said duct (12) has a cylindrical shape and said filtering swab (202) has any one of the following shapes: spherical, cylindrical with parallel bases; cylindrical with a concave base having hemispherical or frustoconical shape; cylindrical with a convex base and having hemispherical or frustoconical shape.

8. The collector according to claim 3, characterized in that said longitudinal cavity (12') is cylindrical and has a cross section with diameter measuring a length in the range 1-25 mm.

9. The collector according to claim 8, characterized in that one of said first wall (120) and second wall (122) has a housing (1200) for a rod (206) (2025).

10. The collector according to claim 1, characterized in that at least one said side (124) carries an interface (1260) elongated transversally to said partition (40) and shaped to house a syringe (166) provided with a nasal nozzle (168) designed to feed washing liquid to a nostril of the nose of a user or another feeding device (30).

11. The collector according to claim 10, characterized in that said funnel-shaped body (10) has a collection tank (100) on the same side as said interface (1260).

12. The collector according to claim 1, characterised in that said coupling means (160) includes a seat (161), with a bottom of said seat (161) being provided with spacers which prevent the edge of said mouth (164) from adhering point by point to the bottom of said seat (161).

13. The collector according to claim 1, characterised in that said body (10) is symmetrical with respect to said partition (40) and presents two interfaces (1260) arranged on opposite sides with respect to said partition (40); two ducts 12, each provided with said outlet portion (16), in order to be suitable for carrying two said test tubes (162).

14. The collector according to claim 2, characterized in that said filtering means (20) comprise a mesh (200) arranged inside said duct (12) downstream of said inlet (14) to axially delimit a longitudinal cavity (12') of given extension.

* * * * *